United States Patent
Gotou et al.

(10) Patent No.: US 10,070,492 B2
(45) Date of Patent: Sep. 4, 2018

(54) DIMMING DEVICE

(71) Applicant: Panasonic Intellectual Property Management Co., Ltd., Osaka (JP)

(72) Inventors: Kiyosi Gotou, Hyogo (JP); Tomohiro Miyake, Mie (JP); Eiichirou Niikura, Mie (JP); Kengo Miyamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/739,742

(22) PCT Filed: Jun. 28, 2016

(86) PCT No.: PCT/JP2016/003098
§ 371 (c)(1),
(2) Date: Dec. 24, 2017

(87) PCT Pub. No.: WO2017/006540
PCT Pub. Date: Jan. 12, 2017

(65) Prior Publication Data
US 2018/0199407 A1 Jul. 12, 2018

(30) Foreign Application Priority Data
Jul. 3, 2015 (JP) ................. 2015-134722

(51) Int. Cl.
*H05B 41/00* (2006.01)
*H05B 33/08* (2006.01)

(52) U.S. Cl.
CPC ....... *H05B 33/0845* (2013.01); *H05B 33/089* (2013.01)

(58) Field of Classification Search
CPC ........ B23K 11/248; B60L 1/14; B61L 5/1881; F21V 23/04; G05F 1/14; H05B 33/0815;
(Continued)

(56) References Cited

U.S. PATENT DOCUMENTS

2013/0187563 A1 7/2013 Sasai et al.
2013/0300308 A1 11/2013 Sadwick
(Continued)

FOREIGN PATENT DOCUMENTS

EP 2 760 119 A1 7/2014
JP S60-153315 U 10/1985
(Continued)

OTHER PUBLICATIONS

International Search Report and Written Opinion for International Application No. PCT/JP2016/003098, dated Sep. 27, 2016.
(Continued)

*Primary Examiner* — Minh D A
(74) *Attorney, Agent, or Firm* — Renner Otto Boisselle & Sklar, LLP

(57) ABSTRACT

The dimming device includes a pair of input terminals, a bidirectional switch, an inputter, a power supply, a controller, and a current limiter. The power supply is electrically connected between the pair of input terminals and is supplied with electric power from an AC power supply to generate control electric power. The controller is supplied with the control electric power from the power supply to operate. The controller is configured to control the bidirectional switch in accordance with a dimming level. The current limiter stops generation of the control electric power by the power supply when a current larger than or equal to a specified value flows from the AC power supply through the power supply.

6 Claims, 4 Drawing Sheets

(58) Field of Classification Search
CPC ............ H05B 33/0818; H05B 41/2828; H05B 41/3921; H05B 41/3927
See application file for complete search history.

(56) References Cited

U.S. PATENT DOCUMENTS

2014/0292218 A1* 10/2014 Vos ................... H05B 33/0815
                                                            315/193
2016/0044760 A1*  2/2016 Robert .............. H05B 33/0851
                                                            315/151

FOREIGN PATENT DOCUMENTS

| JP | H07-031297 Y | 7/1995 |
| JP | 2010-075034 A | 4/2010 |
| JP | 2013-149498 A | 8/2013 |

OTHER PUBLICATIONS

Extended European Search Report for corresponding European Application No. 16821017.7, dated May 11, 2018.

* cited by examiner

DIMMING DEVICE

TECHNICAL FIELD

The present invention relates to a dimming device for dimming an illumination load.

BACKGROUND ART

A dimming device for dimming an illumination load is known (e.g., Patent Literature 1).

The dimming device described in Patent Literature 1 includes a pair of terminals, a control circuit, a control power supply configured to supply control electric power to the control circuit, and a dimming operation section configured to set the dimming level of the illumination load.

Between the pair of terminals, the control circuit and the control power supply are connected in parallel to each other. Moreover, between the pair of terminals, a series circuit of an alternating current (AC) power supply and an illumination load is connected. The illumination load includes a plurality of light emitting diode (LED) devices and a power supply circuit configured to light the LED devices. The power supply circuit includes a smoothing circuit of a diode and an electrolytic capacitor.

The control circuit includes a switch which enables phase control of an AC voltage to be supplied to the illumination load, a switch driver configured to drive the switch, and a controller configured to control the switch driver and the control power supply.

The control power supply is connected in parallel to the switch. The control power supply converts the AC voltage of the AC power supply into control electric power. The control power supply includes an electrolytic capacitor configured to store the control electric power.

The controller is supplied with the control electric power from the control power supply via the electrolytic capacitor. The controller includes a microcomputer. The microcomputer performs reverse phase control in accordance with a dimming level set by the dimming operation section to interrupt power supply to the illumination load during a time period of each of half cycles of the AC voltage.

CITATION LIST

Patent Literature

Patent Literature 1: JP 2013-149498 A

SUMMARY OF INVENTION

It is an object of the present invention to provide a dimming device which is compatible with an increased number of types of illumination loads.

A dimming device according to an aspect of the present invention includes a pair of input terminals, a bidirectional switch, an inputter, a power supply, a controller, and a current limiter. The pair of input terminals is electrically connected between an illumination load and an AC power supply. The bidirectional switch is configured to switch between non-conduction and conduction of a bidirectional current between the pair of input terminals. The inputter is configured to receive a dimming level specifying a magnitude of a light output of the illumination load. The power supply is electrically connected between the pair of input terminals and is configured to be supplied with electric power from the AC power supply to generate control electric power. The controller is configured to be supplied with the control electric power from the power supply to operate. The controller is configured to control the bidirectional switch in accordance with the dimming level. The current limiter is configured to stop generation of the control electric power by the power supply when a current larger than or equal to a specified value flows from the AC power supply to the power supply.

DESCRIPTION OF EMBODIMENTS

First Embodiment (1.1) Configuration

Figure 1:
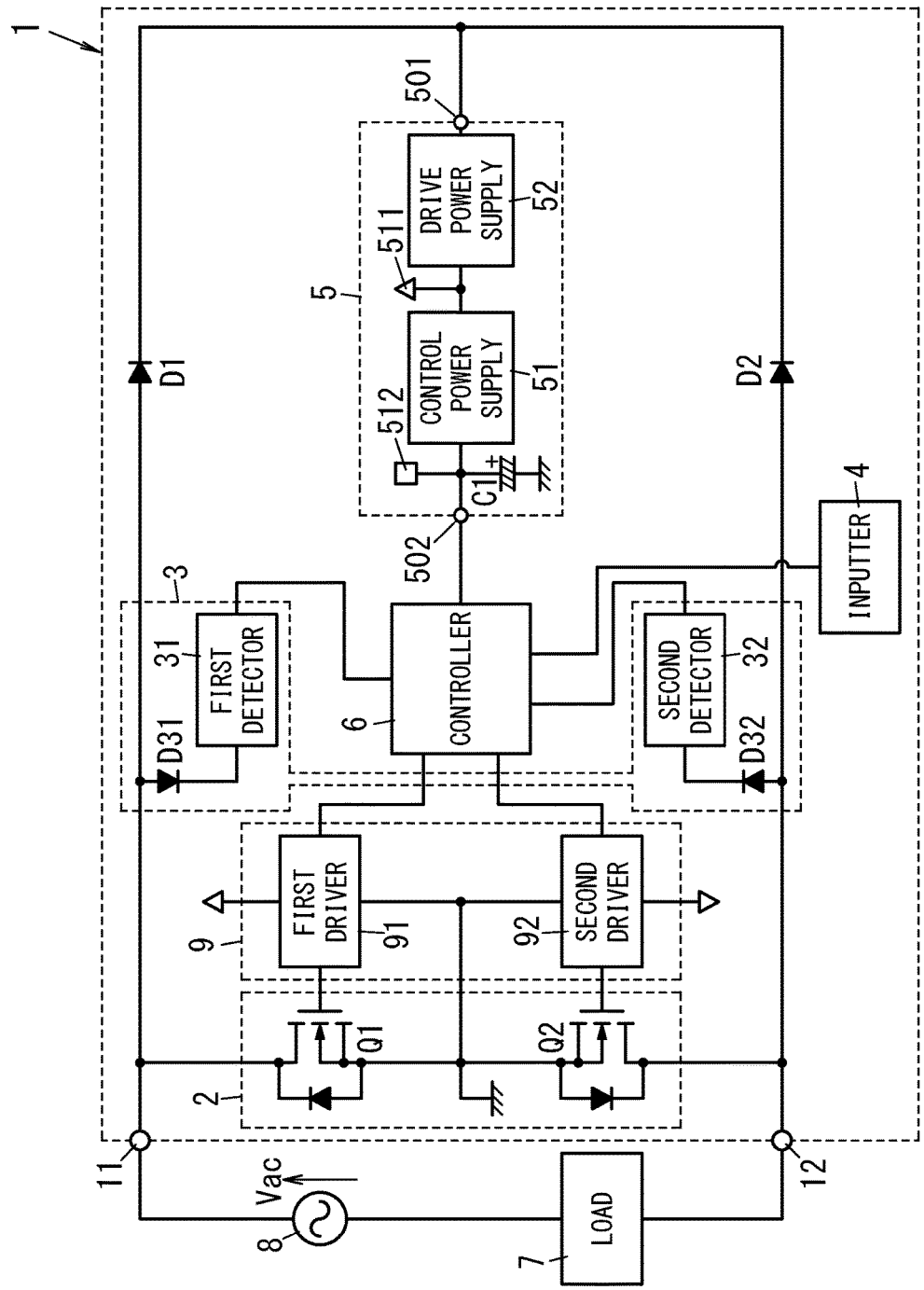
FIG. 1 is a circuit diagram schematically illustrating a configuration of a dimming device according to a first embodiment.

The following configurations are mere examples of the present invention. The present invention is not limited to the following embodiments. Even in embodiments other than these embodiments, various modifications may be made depending on design and the like without departing from the technical idea of the present invention. As illustrated in FIG. 1, a dimming device 1 of the present embodiment includes a pair of input terminals 11 and 12, a bidirectional switch 2, a phase detector 3, an inputter 4, a power supply 5, a controller 6, a switch driver 9, and diodes D1 and D2. The power supply 5 is provided with a current limiter 53 (see FIG. 2).

The pair of input terminals 11 and 12 is electrically connected between an illumination load (hereinafter simply referred to as a "load") 7 and an AC power supply 8. The bidirectional switch 2 is configured to switch between non-conduction and conduction of a bidirectional current between the pair of input terminals 11 and 12. The inputter 4 receives a dimming level specifying a magnitude of a light output of the load 7.

The power supply 5 is electrically connected between the pair of input terminals 11 and 12 and is supplied with electric power from the AC power supply 8 to generate control electric power. The controller 6 is supplied with the control electric power from the power supply 5 to operate. The controller 6 is configured to control the bidirectional switch 2 in accordance with the dimming level. The current limiter 53 stops generation of the control electric power by the power supply 5 when a current larger than or equal to a specified value flows from the AC power supply 8 to the power supply 5.

The "terminal" such as the "input terminal" mentioned herein may not have an entity as a part (terminal) to which an electric wire or the like is to be connected, but the "terminal" may be, for example, a lead of an electronic component, or a part of a conductor included in a circuit board.

The dimming device 1 is a two-wire dimming device and is used electrically connected in series to the load 7 with respect to the AC power supply 8. The load 7 is lit when supplied with electric power. The load 7 includes an LED device as a light source and a lighting circuit configured to light the LED device. The AC power supply 8 is, for example, a commercial power supply having a single phase 100 V and 60 [Hz]. The dimming device 1 is applicable to, for example, a wall switch.

The bidirectional switch 2 includes, for example, two devices, namely a first switching device Q1 and a second switching device Q2 electrically connected in series between the input terminals 11 and 12. For example, each of the switching devices Q1 and Q2 is a semiconductor switching device including an enhancement n-channel metal-oxide-semiconductor field effect transistor (MOSFET).

The switching devices Q1 and Q2 are connected in a so-called anti-series connection between the input terminals 11 and 12. That is, the sources of the switching devices Q1 and Q2 are connected to each other. The drain of the switching device Q1 is connected to the input terminal 11, and the drain of the switching device Q2 is connected to the input terminal 12. The sources of both of the switching devices Q1 and Q2 are connected to ground of the power supply 5. The ground of the power supply 5 is a reference potential for an internal circuit of the dimming device 1.

The bidirectional switch 2 is capable of switching among four states by a combination of on and off of the switching devices Q1 and Q2. The four states include a bidirectionally off state where both the switching devices Q1 and Q2 are off, a bidirectionally on state where both the switching devices Q1 and Q2 are on, and two kinds of unidirectionally on states: a case where only the switching device Q1 is on and a case where only the switching device Q2 is on. In a unidirectionally on state, unidirectional conduction is established between the pair of input terminals 11 and 12, from one of the switching devices Q1 and Q2 which is on, through a parasitic diode of the other of the switching devices Q1 and Q2 which is off. For example, when the switching device Q1 is on and the switching device Q2 is off, a first unidirectionally on state where a current flows from the input terminal 11 toward the input terminal 12 is achieved. Alternatively, when the switching device Q2 is on and the switching device Q1 is off, a second unidirectionally on state where a current flows from the input terminal 12 toward the input terminal 11 is achieved. Thus, when an AC voltage Vac is applied from the AC power supply 8 between the input terminals 11 and 12, in a positive polarity of the AC voltage Vac, that is, in a half period in which the input terminal 11 has a high potential, the first unidirectionally on state is a "forward on state", and the second unidirectionally on state is a "reverse on state". On the other hand, in a negative polarity of the AC voltage Vac, that is, in a half period in which the input terminal 12 has the high potential, the second unidirectionally on state is the "forward on state", and the first unidirectionally on state is the "reverse on state".

Here, the bidirectional switch 2 is in an on state in both the "bidirectionally on state" and the "forward on state", and is in an off state in both the "bidirectionally off state" and the "reverse on state".

The phase detector 3 detects the phase of the AC voltage Vac applied between the input terminals 11 and 12. The "phase" mentioned herein includes a zero crossing point of the AC voltage Vac and the polarity (positive polarity, negative polarity) of the AC voltage Vac. The phase detector 3 is configured to output a detection signal to the controller 6 when the phase detector 3 detects the zero crossing point of the AC voltage Vac. The phase detector 3 includes a diode D31, a first detector 31, a diode D32, and a second detector 32. The first detector 31 is electrically connected to the input terminal 11 via the diode D31. The second detector 32 is electrically connected to the input terminal 12 via the diode D32. The first detector 31 detects a zero crossing point when the AC voltage Vac transitions from a negative half period to a positive half period. The second detector 32 detects a zero crossing point when the AC voltage Vac transitions from the positive half period to the negative half period.

That is, the first detector 31 determines the zero crossing point when detecting a transition from a state where a voltage with the input terminal 11 having a high electric potential is lower than the reference value to a state where the voltage with the input terminal 11 having the high electric potential is higher than or equal to a reference value. Similarly, the second detector 32 determines the zero crossing point when detecting a transition from a state where a voltage with the input terminal 12 having a high electric potential is lower than a reference value to a state where the voltage with the input terminal 12 having a high electric potential is higher than or equal to the reference value. The reference value is a value (an absolute value) set close to 0 V. For example, the reference value of the first detector 31 is a value as high as several volts, and the reference value of the second detector 32 is a value as high as several volts. Thus, detection points at which the zero crossing points are detected by the first detector 31 and the second detector 32 are a little later than the zero crossing points (0 V) in a strict sense.

The inputter 4 receives a signal denoting the dimming level from an operation section operated by a user and outputs the signal as a dimming signal to the controller 6. The inputter 4 may process the received signal or does not have to process the received signal to output the dimming signal. The dimming signal corresponds to a numerical value or the like specifying the magnitude of the light output of the load 7 and may include an "off level" at which the load 7 is in a non-lighting state. The operation section is only required to be configured to be operated by a user to output a signal denoting the dimming level to the inputter 4. The operation section may be, for example, a variable resistor, a rotary switch, a touch panel, a remote controller, or a communication terminal such as a smartphone.

The controller 6 controls the bidirectional switch 2 on the basis of the detection signal from the phase detector 3 and the dimming signal from the inputter 4. The controller 6 individually controls the switching devices Q1 and Q2. Specifically, the controller 6 controls the switching device Q1 by a first control signal and controls the switching device Q2 by a second control signal.

The controller 6 includes, for example, a microcomputer as a main configuration. The microcomputer executes a program stored in memory of the microcomputer by a central processing unit (CPU) to realize a function as the controller 6. The program may be stored in the memory of the microcomputer in advance, may be provided as a recording medium such as a memory card storing the program, or may be provided via an electronic communication network. In other words, the program is a program which causes a computer (in this embodiment the microcomputer) to function as the controller 6.

The switch driver 9 includes a first driver 91 configured to drive (perform on/off control of) the switching device Q1 and a second driver 92 configured to drive (perform on/off control of) the switching device Q2. The first driver 91 receives the first control signal from the controller 6 to apply a gate voltage to the switching device Q1. In this way, the first driver 91 performs the on/off control of the switching device Q1. Similarly, the second driver 92 receives the second control signal from the controller 6 to apply a gate voltage to the switching device Q2. In this way, the second driver 92 performs the on/off control of the switching device Q2. The first driver 91 generates the gate voltage with reference to the potential of the source of the switching device Q1. The same applies to the second driver 92.

The power supply 5 includes a control power supply 51 configured to generate control electric power, a drive power supply 52 configured to generate drive electric power, and a first capacitive element (capacitor) C1. The drive power supply 52 has an output terminal forming a first power supply terminal 511. The control power supply 51 has an output terminal forming a second power supply terminal 512. The power supply 5 outputs the drive electric power from the first power supply terminal 511 and the control electric power from the second power supply terminal 512. The control electric power is electric power for operating the controller 6. The drive electric power is electric power for driving the switch driver 9. The capacitive element C1 is electrically connected to the output terminal (the second power supply terminal 512) of the control power supply 51 and is charged with an output current of the control power supply 51.

The power supply 5 is electrically connected to the input terminal 11 via the diode D1 and is electrically connected to the input terminal 12 via the diode D2. Thus, a diode bridge including the pair of diodes D1 and D2 and parasitic diodes of the switching devices Q1 and Q2 performs full-wave rectification of the AC voltage Vac applied between the input terminals 11 and 12, and the full-wave rectified AC voltage Vac is then supplied to the power supply 5. The drive power supply 52 smooths the full-wave rectified AC voltage Vac to generate the drive electric power. The drive power supply 52 supplies the drive electric power to the switch driver 9 and the control power supply 51. The drive electric power is, for example, 10 V.

The control power supply 51 is electrically connected to the output terminal (the first power supply terminal 511) of the drive power supply 52. The control power supply 51 steps down the drive electric power supplied from the drive power supply 52 to generate the control electric power and outputs the control electric power to the capacitive element C1. The control electric power is, for example, 3 V. The control power supply 51 may generate the control electric power directly from the full-wave rectified AC voltage Vac without using the drive power supply 52. That is, the power supply 5 is supplied with electric power from the AC power supply 8, thereby generating the control electric power and the drive electric power. The configuration of the power supply 5 will be specifically described under "(1.3) As to Power Supply".

The lighting circuit of the load 7 reads a dimming level from the waveform of the AC voltage Vac phase-controlled by the dimming device 1 to vary the magnitude of the light output of the LED device. Here, the lighting circuit includes, for example, a circuit for securing a current such as a bleeder circuit. Thus, also during a time period during which the bidirectional switch 2 of the dimming device 1 is non-conductive, a current is allowed to pass through the load 7.

(1.2) Operation (1.2.1) Activation Operation

First, activation operation when conduction of the dimming device 1 of the present embodiment is started will be described.

In the dimming device 1 having the above-described configuration, when the AC power supply 8 is connected between the input terminals 11 and 12 via the load 7, the AC voltage Vac applied between the input terminal 11 and 12 from the AC power supply 8 is rectified, and then the AC voltage Vac is supplied to the drive power supply 52. The drive electric power generated by the drive power supply 52 is supplied to the switch driver 9 and to the control power supply 51. When the control electric power generated by the control power supply 51 is supplied to the controller 6, the controller 6 is activated.

When the controller 6 is activated, the controller 6 determines the frequency of the AC power supply 8 on the basis of a detection signal of the phase detector 3. Then, on the basis of the frequency determined by the controller 6, the controller 6 refers to a numerical value table stored in memory in advance to set various types of parameters such as a time. Here, if the dimming level input to the inputter 4 is the "off level", the controller 6 maintains the bidirectional switch 2 in the bidirectionally off state to keep the impedance between the pair of input terminals 11 and 12 in a high impedance state. Thus, the load 7 keeps a non-lighting state.

(1.2.2) Dimming Operation

Figure 3:
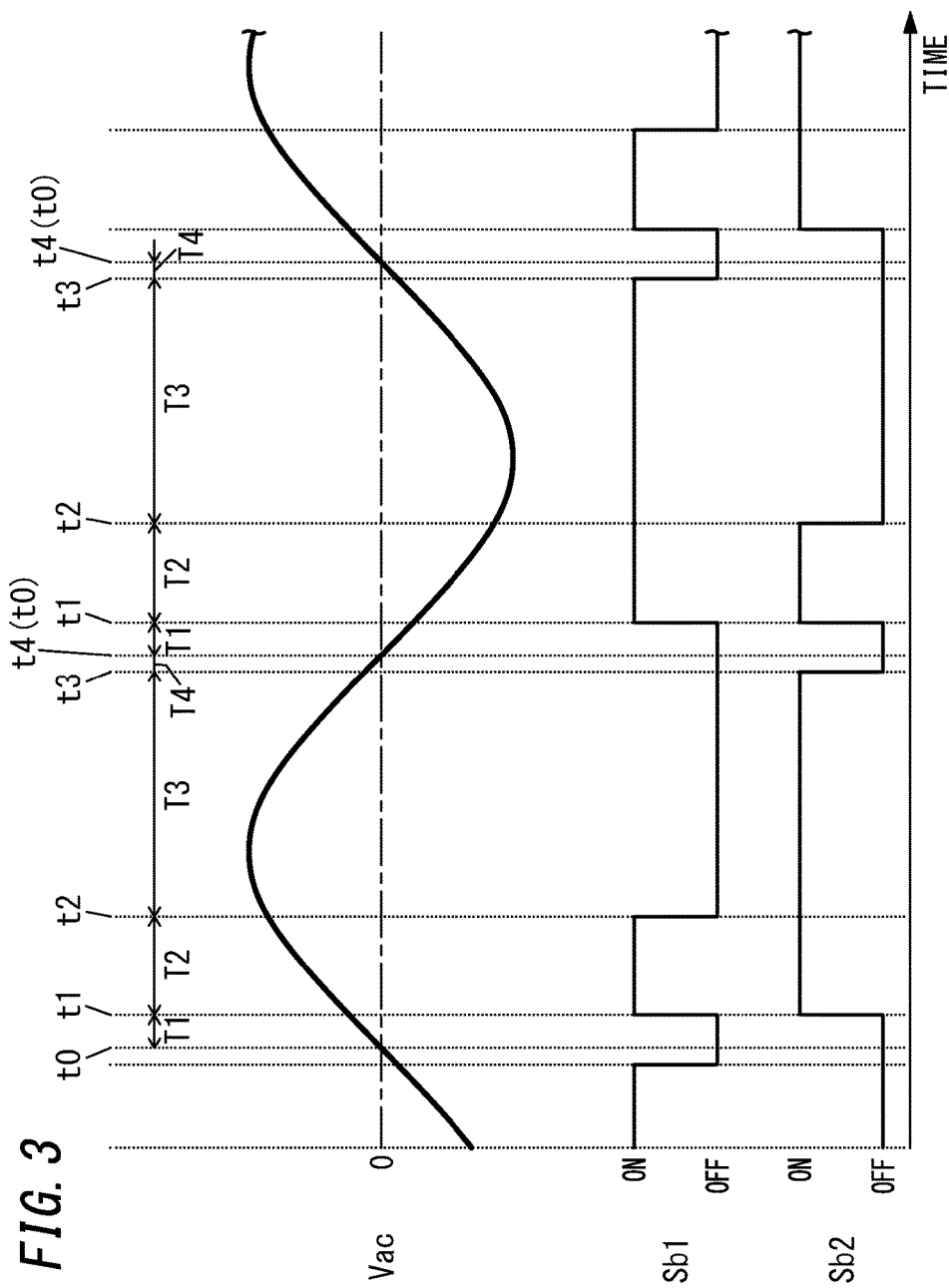
FIG. 3 is a timing chart illustrating operation of the dimming device according to the first embodiment.

Next, dimming operation of the dimming device 1 of the present embodiment will be described with reference to FIG. 3. FIG. 3 shows the AC voltage "Vac", the first control signal "Sb1", and the second control signal "Sb2".

First, the operation of the dimming device 1 during a positive half period of the AC voltage Vac is described. The dimming device 1 detects the zero crossing point of the AC voltage Vac by the phase detector 3. The zero crossing point serves as a reference for phase control. The first detector 31 outputs a first detection signal when the AC voltage Vac reaches a positive reference value in the course of a transition of the AC voltage Vac from a negative half period to the positive half period. In the present embodiment, a time point at which the first detection signal is generated is a "detection point", and a sum of: a time period from a starting time point (zero crossing point) t0 of the half period to the detection point; and a time period from the detection point until a lapse of a definite time (e.g., 300 μs) is a first time period T1. During the first time period T1 from the starting time point (zero crossing point) t0 of the half period to a first time point t1 after a lapse of a first time, the controller 6 controls such that the first control signal Sb1 and the second control signal Sb2 are "off" signals. Thus, during the first time period T1, both the switching devices Q1 and Q2 are off, and the bidirectional switch 2 is in a bidirectionally off state. At the time point after a definite time (e.g., 300 μs) has elapsed since the detection point, that is, at the first time point t1, the controller 6 sets the first control signal Sb1 and the second control signal Sb2 to "on" signals.

A second time point t2 is a time point after a lapse of a second time according to the dimming signal from the first time point t1. At the second time point t2, the controller 6 keeps the second control signal Sb2 set to the "on" signal and sets the first control signal Sb1 to an "off" signal. In this way, during a second time period T2 from the first time point t1 to the second time point t2, both the switching devices Q1 and Q2 are on, and the bidirectional switch 2 is in a bidirectionally on state. Thus, during the second time period T2, electric power is supplied from the AC power supply 8 via the bidirectional switch 2 to the load 7, and the load 7 therefore emits light.

A third time point t3 is a time point earlier than an end time point (zero crossing point) t4 of the half period by a definite time (e.g., 300 μs). At the third time point t3, the controller 6 sets the first control signal Sb1 and the second control signal Sb2 to "off" signals. In this way, during a third time period T3 from the second time point t2 to the third time point t3, only the switching device Q1 of the switching devices Q1 and Q2 is off, and the bidirectional switch 2 is in a reverse on state. Thus, during the third time period T3, electric power from the AC power supply 8 to the load 7 is interrupted.

During a fourth time period T4 from the third time point t3 to the end time point (zero crossing point) t4 of the half period, both the switching devices Q1 and Q2 are off, and the bidirectional switch 2 is in the bidirectionally off state.

Moreover, the operation of the dimming device 1 during the negative half period of the AC voltage Vac is substantially the same as that during the positive half period.

During the negative half period, a time period from a starting time point t0 (t4) of the half period to a first time point t1 after a lapse of a first time is referred to as a first time period T1. Moreover, a second time point t2 is a time point after a lapse of a second time according to the dimming signal from the first time point t1, and a third time point t3 is a time point earlier than an end time point t4 (t0) of the half period by a definite time (e.g., 300 µs).

During the first time period T1, the controller 6 controls such that the first control signal Sb1 and the second control signal Sb2 are "off" signals. Thus, the bidirectional switch 2 is in the bidirectionally off state during the first time period T1. Then, at the first time point t1, the controller 6 sets the first control signal Sb1 and second control signal Sb2 to the "on" signals. In this way, during a second time period T2 from the first time point t1 to the second time point t2, both the switching devices Q1 and Q2 are on, and the bidirectional switch 2 is in a bidirectionally on state. Thus, during the second time period T2, electric power is supplied from the AC power supply 8 via the bidirectional switch 2 to the load 7, and the load 7 therefore emits light.

At the second time point t2, the controller 6 keeps the first control signal Sb1 set to the "on" signal and sets the second control signal Sb2 to an "off" signal. At the third time point t3, the controller 6 sets the first control signal Sb1 and the second control signal Sb2 to "off" signals. In this way, during a third time period T3 from the second time point t2 to a third time point t3, only the switching device Q2 of the switching devices Q1 and Q2 is off, and the bidirectional switch 2 is in the reverse on state. Thus, during the third time period T3, electric power from the AC power supply 8 to the load 7 is interrupted.

The dimming device 1 of the present embodiment alternately repeats the operation during the positive half period and the operation during the negative half period every half period of the AC voltage Vac which are described above to dim the load 7. During the time period from the starting time point (zero crossing point) t0 to the first time point t1 of the half period, the bidirectional switch 2 is in an off state, and during the time period from the second time point t2 to the end time point (zero crossing point) t4 of the half period, the bidirectional switch 2 is in the off state. Thus, when attention is focused on two consecutive half periods, the bidirectional switch 2 is in the off state from the second time point t2 of the first half period to the first time point t1 of the next half period (i.e., the second half period).

Here, since a time (second time) from the first time point t1 to the second time point t2 is a time corresponding to the dimming level input to the inputter 4, a time for which conduction is established between the input terminals 11 and 12 during the half period is determined in accordance with the dimming level. In other words, the controller 6 controls the bidirectional switch 2 in accordance with the dimming level. That is, to reduce the light output of the load 7, a short second time is determined, and to increase the light output of the load 7, a long second time is determined. Thus, the magnitude of the light output of the load 7 can be changed in accordance with the dimming level input to the inputter 4. Moreover, since the zero crossing point of the AC voltage Vac is between time periods (the first time period T1 and the fourth time period T4) during which the bidirectional switch 2 is in the bidirectionally off state, the dimming device 1 can secure supplying electric power from the AC power supply 8 to the power supply 5 during these time periods.

Figure 2:
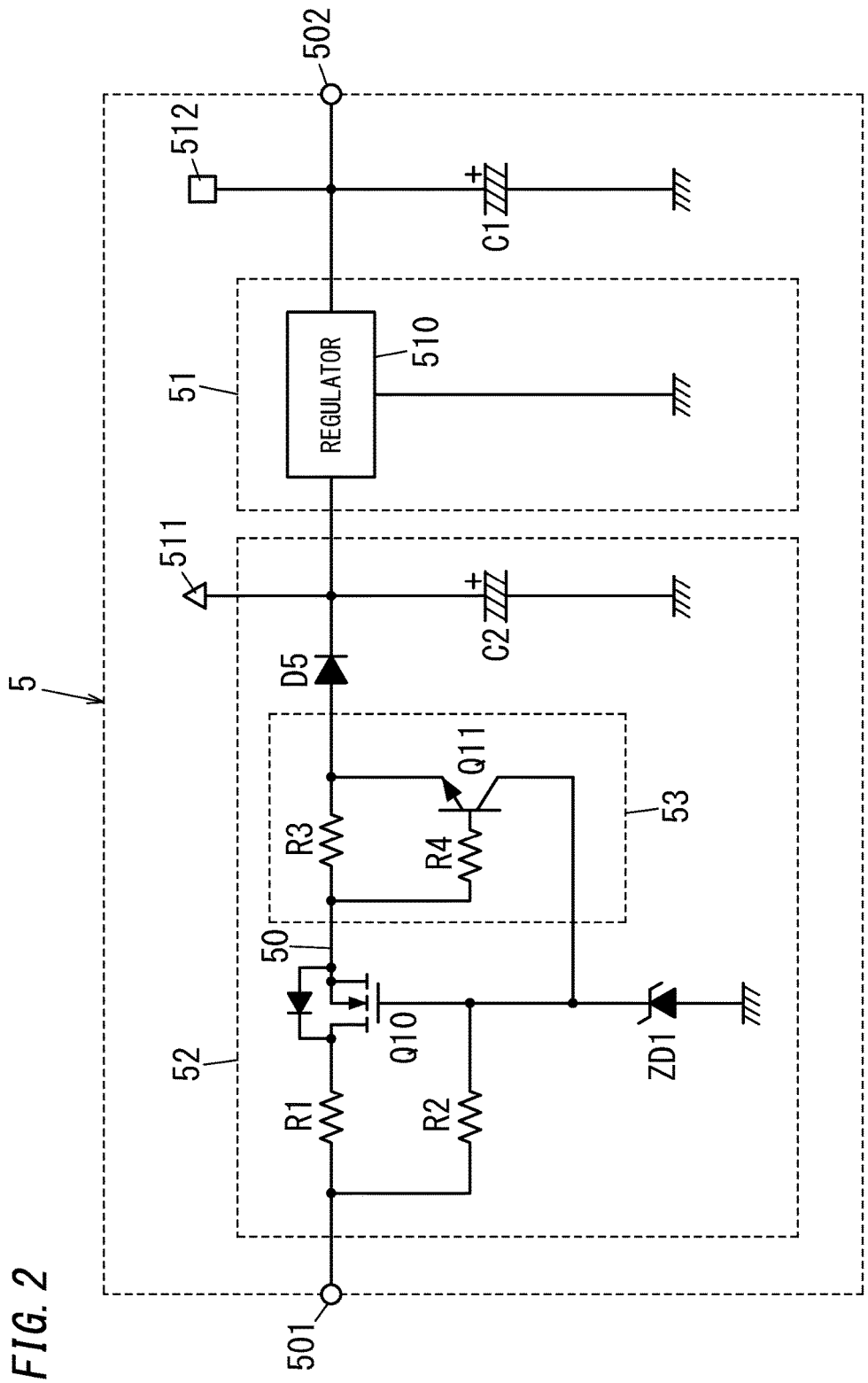
FIG. 2 is a circuit diagram schematically illustrating a configuration of a power supply of the dimming device according to the first embodiment.

(1.3) As to Power Supply (1.3.1) Configuration and Basic Operation of Power Supply The configuration of the power supply 5 will be described in further detail. As illustrated in FIG. 2, the power supply 5 includes the current limiter 53. In the example shown in FIG. 2, the current limiter 53 is included in the drive power supply 52. A power supply input terminal 501 corresponds to an input terminal of the power supply 5 and is electrically connected to the cathodes of the diodes D1 and D2. Thus, when the bidirectional switch 2 is in the off state, the full-wave rectified AC voltage Vac (a pulsating voltage output from the diode bridge) is applied between the power supply input terminal 501 and ground (a reference potential point). A power supply output terminal 502 which is electrically equivalent to the second power supply terminal 512 corresponds to an output terminal of the power supply 5 and is electrically connected to the controller 6. In FIG. 2, the left and right sides of FIG. 1 are reversed, and the drive power supply 52 is on the left of the control power supply 51.

In the present embodiment, the drive power supply 52 includes a Zener diode ZD1, a transistor Q10, a first resistor R1, a second resistor R2, a diode D5, and a second capacitive element (capacitor) C2. The drive power supply 52 forms a constant voltage circuit including the Zener diode ZD1 and the transistor Q10.

Specifically, the resistor R1, the transistor Q10, the diode D5, and the capacitive element C2 are electrically connected in series between the power supply input terminal 501 and ground. Thus, a series circuit of the resistor R1, the transistor Q10, and the diode D5 is part of a charging path 50 for the capacitive element C2. Between the transistor Q10 and the diode D5, a third resistor R3 of the current limiter 53 is disposed, but the configuration of the drive power supply 52 is first described provided that the current limiter 53 is omitted (i.e., the transistor Q10 and the diode D5 are directly connected to each other).

The transistor Q10 includes, for example, an enhancement n-channel MOSFET. The transistor Q10 has a drain electrically connected to the power supply input terminal 501 via the resistor R1. The transistor Q10 has a source serving as an output terminal and being electrically connected to the anode of the diode D5. The diode D5 has a cathode electrically connected to ground via the capacitive element C2. The capacitive element C2 has a high-potential-side terminal, that is, a connection point to the diode D5, and the high-potential-side terminal is electrically equivalent to the first power supply terminal 511 serving as the output terminal of the drive power supply 52. The "output terminal of the transistor Q10" means a terminal from which a constant voltage is output when the transistor Q10 is used as the above-described constant voltage circuit. In general, a transistor includes a pair of main terminals (a drain and a source in the case of a MOSFET) and a control terminal (a gate in the case of a MOSFET), and thus, one of the pair of main terminals corresponds to the output terminal of the transistor Q10 in this embodiment.

The resistor R2 and the Zener diode ZD1 are electrically connected in series between the power supply input terminal 501 and ground. The Zener diode ZD1 has a cathode electrically connected to the power supply input terminal 501 via the resistor R2. The Zener diode ZD1 has an anode electrically connected to ground. The transistor Q10 has a gate (a control terminal) electrically connected to the cathode of the Zener diode ZD1.

According to the above-described configuration, the drive power supply 52 receives electric power supplied from the AC power supply 8 to charge the capacitive element C2 with a constant voltage based on a Zener voltage (breakdown voltage) of the Zener diode ZD1. That is, when a series circuit of the resistor R2 and the Zener diode ZD1 applies a gate voltage higher than or equal to the threshold voltage of the transistor Q10 between the gate and the source of the transistor Q10, a constant voltage is output from the source of the transistor Q10. At this time, a voltage between the gate and the ground of the transistor Q10 is clamped to the Zener voltage of the Zener diode ZD1. Thus, a voltage obtained by subtracting the gate voltage of the transistor Q10 and the forward voltage of the diode D5 from the Zener voltage is to be applied across the capacitive element C2. Thus, the drive power supply 52 outputs drive electric power having a constant voltage from the first power supply terminal 511.

The control power supply 51 in the present embodiment includes a regulator 510 including a three-terminal regulator (a series regulator). The regulator 510 has an input terminal electrically connected to the output terminal (the first power supply terminal 511) of the drive power supply 52. The regulator 510 has an output terminal electrically connected to a reference potential point via the capacitive element C1. The capacitive element C1 has a high-potential-side terminal, that is, a connection point to the regulator 510, and the high-potential-side terminal is electrically equivalent to the second power supply terminal 512 serving as the output terminal of the control power supply 51.

According to the above-described configuration, the control power supply 51 charges the capacitive element C1 with a constant voltage obtained by stepping down an input voltage from the drive power supply 52 by the regulator 510. Thus, the control power supply 51 outputs control electric power of a constant voltage from the second power supply terminal 512.

(1.3.2) Configuration and Operation of Current Limiter

Next, the configuration of the current limiter 53 will be described. In the present embodiment, the current limiter 53 is disposed in the charging path 50 for the capacitive element C2 between the input terminal 11 and 12, and when a current larger than or equal to a specified value flows through the charging path 50, the charging path 50 is interrupted to stop the generation of the control electric power by the power supply 5. The charging path 50 in this embodiment means a path through which a current flowing toward the capacitive element C2 flows and includes the series circuit of the resistor R1, the transistor Q10, and the diode D5. Moreover, in the present embodiment, the current limiter 53 turns off the transistor Q10 when a current larger than or equal to a specified value flows through the transistor Q10 of the drive power supply 52, thereby interrupting the charging path 50, and stopping the generation of the control electric power by the power supply 5.

Specifically, the current limiter 53 includes the third resistor R3, a fourth resistor R4, and a third switching device Q11. The resistor R3 is a shunt resistor which is electrically connected to the output terminal (the source) of the transistor Q10 and which functions as a detection resistor for detecting a current flowing through the transistor Q10. In this embodiment, the resistor R3 is electrically connected between the source of the transistor Q10 in the drive power supply 52 and the anode of the diode D5.

The switching device Q11 is electrically connected between the output terminal (the source) and the control terminal (gate) of the transistor Q10. The switching device Q11 includes, for example, an npn-bipolar transistor. The switching device Q11 has an emitter electrically connected to the source of the transistor Q10 via the resistor R3. The switching device Q11 has a collector electrically connected to the gate of the transistor Q10. The switching device Q11 has a base electrically connected to the source of the transistor Q10 via the resistor R4. That is, a series circuit of the resistor R3 and the resistor R4 is electrically connected between the base and the emitter of the switching device Q11.

With this configuration, when a current (drain current) flowing through the transistor Q10 becomes larger than or equal to the specified value, a voltage across the resistor R3 turns on the switching device Q11, and the current limiter 53 thereby turns off the transistor Q10. That is, when a current larger than or equal to the specified value flows from the transistor Q10 to the resistor R3, this current generates a voltage at the resistor R3, and this voltage biases the switching device Q11, so that a current flows into the base of the switching device Q11 through the resistor R4. Here, turning on of the switching device Q11 short-circuits the gate and the source of the transistor Q10, thereby turning off the transistor Q10. This interrupts the charging path 50 for the capacitive element C2 and stops the generation of the control electric power by the power supply 5. In other words, when a current larger than or equal to the specified value flows from the AC power supply 8 to the power supply 5, the current limiter 53 electrically disconnects the capacitive element C2 from the power supply input terminal 501, thereby stopping generation of the drive electric power and the control electric power by the power supply 5.

Moreover, in the present embodiment, the charging path 50 for the capacitive element C2 also serves as the charging path 50 for the capacitive element C1, and therefore, the current limiter 53 interrupts not only the charging path 50 for the capacitive element C2 but also the charging path 50 for the capacitive element C1. The current limiter 53 may be disposed in only the charging path 50 for one of the capacitive elements C1 and C2. The current limiter 53 may be disposed in only the charging path 50 for the capacitive element C1, for example, between the drive power supply 52 and the control power supply 51.

The specified value mentioned herein is a current value of the power supply 5 when the current limiter 53 operates, and the specified value mentioned herein can be arbitrarily set by a circuit constant such as a resistance value of the resistor R3. In the present embodiment, for example, a value obtained by adding a prescribed margin to a rated current value of the power supply 5 is defined as the specified value.

(1.3.3) Comparison with Comparative Example

A dimming device having a configuration in which the current limiter 53 is omitted from the present embodiment is hereinafter defined as a comparative example, and the present embodiment and the comparative example are compared with each other to describe differences between the present embodiment and the comparative example. The comparative example shown herein is different from the present embodiment in that the current limiter is not provided, but the other circuit configurations of the comparative example are the same as those of the present embodiment, and thus, components similar to those of the present embodiment will be described hereinafter by using the same reference signs as those in the present embodiment.

In the comparative example, when conduction (supplying of electric power from the AC power supply 8) is started in a state where the capacitive elements C1 and C2 of the power supply 5 have no stored electric charges, for example, at a recovery from a power failure of the AC power supply 8, an inrush current larger than the rated current value may temporarily flow through the power supply 5. In this case, the input impedance of the power supply 5 is in a low impedance state, and therefore, even when the bidirectional switch 2 is in the bidirectionally off state, a current (the inrush current) is to flow between the pair of input terminals 11 and 12. The inrush current which flows between the pair of input terminals 11 and 12 also flows through the load 7. Thus, depending on the type of the load 7, a so-called flashing phenomenon may occur in which the inrush current temporarily lights the light source of the load 7. Moreover, when a large current larger than the rated current value of the power supply 5 flows through the power supply 5, stress may be applied to the components of the dimming device.

In contrast, in the present embodiment, when the inrush current is about to flow to the power supply 5, the current limiter 53 operates at a time point at which a current flowing through the power supply 5 exceeds the specified value, and the generation of the control electric power by the power supply 5 stops. Specifically, the switching device Q11 of the current limiter 53 is turned on, thereby turning off the transistor Q10 included in the charging path 50 for the capacitive element C2. When the transistor Q10 is turned off, the charging path 50 for the capacitive element C2 is interrupted, and the generation of the control electric power by the power supply 5 stops. In this case, the input impedance of the power supply 5 enters the high impedance state, and therefore, if the bidirectional switch 2 is in the bidirectionally off state, the current (the inrush current) no longer flows between the pair of input terminals 11 and 12. Thus, according to the present embodiment, the flashing phenomenon of the load 7 caused by the inrush current can be prevented regardless of the type of the load 7. Moreover, when the specified value is set to a value close to the rated current value of the power supply 5, it is also possible to avoid application of stress to the components of the dimming device 1 due to a flow of a large current larger than the rated current value through the power supply 5.

The above-described inrush current is a mere example, and even when a large current other than the inrush current is about to flow through the power supply 5, the current limiter 53 of the dimming device 1 of the present embodiment operates to stop the generation of the control electric power by the power supply 5. In sum, the current limiter 53 has a function of limiting a current flowing through the power supply 5 so as not to allow a current larger than or equal to the specified value to flow through the power supply 5.

(1.4) Advantages

The dimming device 1 of the present embodiment includes the current limiter 53, and therefore, when a current larger than or equal to the specified value flows through the power supply 5, the dimming device 1 stops the power supply 5 to enable the input impedance of the power supply 5 to enter the high impedance state. This reduces the occurrence of the flashing phenomenon in which the light source which is the load 7 is temporarily lit due to a flow of a large current such as the above-described inrush current through the power supply 5. Thus, the dimming device 1 of the present embodiment provides compatibility with an increased number of types of loads. Moreover, limiting the current flowing through the power supply 5 also provides the advantage of a reduction in stress applied to the components of the dimming device 1.

Moreover, in the present embodiment, the power supply 5 includes the capacitive elements C1 and C2. In this case, the current limiter 53 is preferably disposed in the charging path 50 for the capacitive elements C1 and C2 between the pair of input terminals 11 and 12 and is preferably configured to interrupt the charging path 50 when a current larger than or equal to the specified value flows through the charging path 50. With this configuration, the current limiter 53 can limit a charging current toward the capacitive elements C1 and C2. The capacitive elements C1 and C2 in the present embodiment are not components essential for the dimming device 1, and thus, one or both of the capacitive elements C1 and C2 may be omitted accordingly.

Moreover, in the present embodiment, the power supply 5 includes a constant voltage circuit (the drive power supply 52) including the Zener diode ZD1 and the transistor Q10. In this case, the current limiter 53 is preferably configured to turn off the transistor Q10 when a current larger than or equal to the specified value flows through the transistor Q10. With this configuration, the current limiter 53 turns off the transistor Q10, which enables the generation of the control electric power by the power supply 5 to be stopped, and the current limiter 53 can be realized with a relatively simple circuit configuration.

Moreover, as in the present embodiment, the current limiter 53 preferably includes a resistor (the detection resistor) R3 electrically connected to the output terminal of the transistor Q10 and a switching device Q11 electrically connected between the output terminal and the control terminal of the transistor Q10. In this case, the current limiter 53 is configured such that when a current larger than or equal to the specified value flows through the resistor R3, the voltage across the resistor R3 turns on the switching device Q11. With this configuration, the resistor R3 can be used for detecting a current and for driving (for performing on/off control of) the switching device Q11, and thus, the current limiter 53 can be realized with a relatively simple configuration.

(1.5) Variation (1.5.1) First Variation

Figure 4:
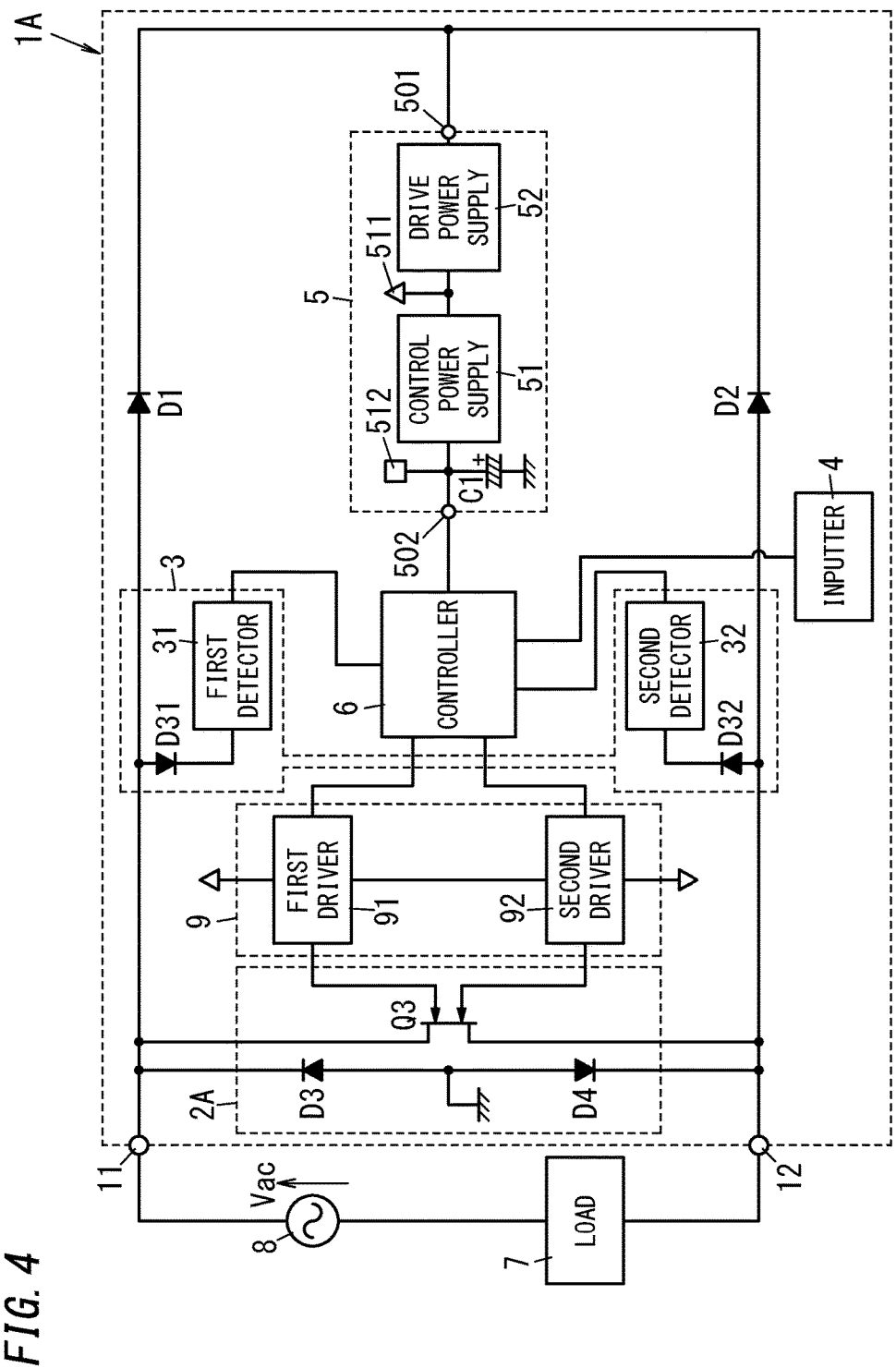
FIG. 4 is a circuit diagram schematically illustrating a configuration of a dimming device according to a first variation of the first embodiment.

As illustrated in FIG. 4, a bidirectional switch 2A of a dimming device 1A according to a first variation of the first embodiment is different from the bidirectional switch 2 of the dimming device 1 of the first embodiment. Components similar to those in the first embodiment are hereinafter denoted by the same reference signs as those in the first embodiment, and the description thereof will be omitted accordingly.

In the present variation, the bidirectional switch 2A includes a switching device Q3 having a double gate structure. The switching device Q3 is a semiconductor element having a double gate (dual gate) structure including a semiconductor material of a wide band gap such as gallium nitride (GaN). Moreover, the bidirectional switch 2A includes a pair of diodes D3 and D4 connected to each other in a so-called anti-series connection between input terminals 11 and 12. The cathode of the diode D3 is connected to the input terminal 11, and the cathode of the diode D4 is connected to the input terminal 12. The anodes of both the diodes D3 and D4 are electrically connected to ground of a power supply 5. In the present variation, the pair of diodes D3 and D4 and a pair of diodes D1 and D2 together form a diode bridge.

According to the configuration of the present variation, the bidirectional switch 2A can reduce the conduction loss more than the bidirectional switch 2.

(1.5.2) Other Variations

Variations of the first embodiment other than the above-described first variation will be mentioned below.

The dimming device of each of the above-described first embodiment and the first variation is applicable not only to the load 7 using an LED device as a light source but also a light source including a capacitor input-type circuit, having a high impedance, and being lit with a small current. Examples of such a light source include an organic electroluminescence (EL) element. Moreover, the dimming device is applicable to loads 7 of various light sources such as a discharge lamp.

Moreover, the switch driver 9 is not a component essential for the dimming device 1 and may thus be omitted accordingly. When the switch driver 9 is omitted, the controller 6 directly drives the bidirectional switch 2. When the switch driver 9 is omitted, the drive power supply 52 is omitted.

The bidirectional switch 2 may be controlled to be in a "forward on state" instead of a "bidirectionally on state" or in contrast, the bidirectional switch 2 may be controlled to be in the "bidirectionally on state" instead of the "forward on state". Moreover, the bidirectional switch 2 may be controlled to be in a "reverse on state" instead of the "bidirectionally off state" or may be controlled to be in the "bidirectionally off state" instead of the "reverse on state". That is, it is required only that the state, namely the on state or the off state, of the bidirectional switch 2 does not change.

Moreover, a control method of the bidirectional switch 2 by the controller 6 is not limited to the above-described examples, and may be, for example, a method for alternately setting the first control signal and the second control signal to the "on" signal at the same cycle as the AC voltage Vac. In this case, the bidirectional switch 2 is conductive during a time period during which one of the switching devices Q1 and Q2 corresponding to a high-potential side of the AC voltage Vac is on. That is, this variation realizes so-called reverse phase control for establishing conduction between the pair of input terminals 11 and 12 during a time period from the zero crossing point of the AC voltage Vac to a time point during the half period. In this case, a phase difference between the first control signal and the second control signal and the AC voltage Vac are controlled to adjust conduction time of the bidirectional switch 2.

Moreover, the control method is not limited to the reverse phase control method (trailing edge method) but may be a normal phase control method (leading edge method). The normal phase control method establishes conduction between the pair of input terminals 11 and 12 during a time period from a time point during the half period of the AC voltage Vac to the zero crossing point.

Moreover, each of the switching devices Q1 and Q2 included in the bidirectional switch 2 is not limited to an enhancement n-channel MOSFET but may be, for example, an insulated gate bipolar transistor (IGBT). Moreover, in the bidirectional switch 2, the rectifier element (diode) for realizing the unidirectionally on state is not limited to the parasitic diodes of the switching devices Q1 and Q2 but may be an external diode such as those described in the first variation. The diode may be accommodated in an identical package with each of the switching devices Q1 and Q2.

Similarly, the transistor Q10 of the power supply 5 is not limited to the enhancement n-channel MOSFET but may be, for example, an npn-bipolar transistor. In this case, the emitter of the transistor Q10 corresponds to the output terminal of the transistor Q10, and the base of the transistor Q10 corresponds to the control terminal of the transistor Q10.

Moreover, a specific circuit of the power supply 5 is not limited to the circuit shown in FIG. 2 but may be accordingly modified. For example, when the control electric power is also used as the drive electric power, the power supply 5 may have a one-stage circuit configuration including only the control power supply 51 but not a two-stage circuit configuration including the drive power supply 52 and the control power supply 51. The drive power supply 52 may be, for example, a constant voltage circuit including an operational amplifier in addition to the Zener diode ZD1 and the transistor Q10, or the transistor Q10 may be omitted. Similarly to the drive power supply 52, the control power supply 51 may be, for example, a constant voltage circuit including a Zener diode and a transistor. The capacitive elements of the power supply 5 are provided on output sides of the drive electric power supply and the control electric power supply, but for example, a capacitive element may be provided on an input side of the power supply 5.

Moreover, the specific circuit of the current limiter 53 is not limited to the circuit shown in FIG. 2 but may be modified accordingly. Moreover, the current limiter 53 is not necessarily included in the drive power supply 52 but may be included in, for example, the control power supply 51 or may be provided separately from the power supply 5. Alternatively, the current limiter 53 may include a first functioning section and a second functioning section which are separately provided. The first functioning section is configured to detect a current flowing through the power supply 5. The second functioning section is configured to stop generation of the control electric power by the power supply 5 when the second functioning section receives a detection value of the first functioning section. The switching device Q11 of the current limiter 53 is not limited to the bipolar transistor but may be, for example, an enhancement n-channel MOSFET.

Moreover, the first time is required only to be a certain length of time period, and the length of the first time can be accordingly set. For example, when a sum of: a time period from a starting time point (zero crossing point) t0 of the half period to a detection point; and a time period from the detection point until a certain stand-by time elapses corresponds to the first time period T1, the stand-by time is not limited to 300 μs but is accordingly set to a value within a range from 0 μs to 500 μs.

Moreover, the third time point t3 is required only to be before the end time point (zero crossing point) t4 of the half period, and the length from the third time point t3 to the end time point t4 of the half period can be accordingly determined. For example, when the time length from the detection point to the third time point t3 is shorter than the half period by a certain first specified time, the first specified time is not limited to 300 μs but may be accordingly set to a value within a range from 100 μs to 500 μs.

The diodes D1 and D2 in the first embodiment are not essential elements of the dimming device 1, and thus, the diodes D1 and D2 may be accordingly omitted.

Moreover, in comparison between two values such as the value of the current flowing through the power supply 5 and the specified value, "larger than or equal to" includes both a case where the two values are equal to each other and a case where one of the two values is larger than the other of the two values. However, the meaning of the "larger (higher) than or equal to" mentioned herein is not limited to the above definition but "larger (higher) than or equal to" mentioned herein may be a synonym of "larger (higher) than" which includes only a case where one of the two values is larger than the other of the two values. That is, whether or not a case where the two values are equal to each other is included can be arbitrarily changed depending on the setting of the specified value and the like, and therefore, there is no technical difference between "larger (higher) than or equal to" and "larger (higher) than". Similarly, "lower than" may be a synonym of "lower than or equal to".

Other Embodiments

In each of the above-described first embodiment (including the variations), an electric power supply from the AC power supply 8 to the power supply 5 is secured over periods (the first time period T1 and the fourth time period T4) before and after the starting time point (zero crossing point) t0 of the half period of the AC voltage Vac, but the above-described embodiments are not limited to this configuration.

Only during a period (the first time period T1) after the starting time point (zero crossing point) t0 of the half period of the AC voltage Vac, the electric power supply from the AC power supply 8 to the power supply 5 may be secured for a definite time. Moreover, only during a period (the fourth time period T4) before the starting time point (zero crossing point) t0 of the half period of the AC voltage Vac, the electric power supply from the AC power supply 8 to the power supply 5 may be secured for a definite time. That is, during at least one of the first time period T1 and the fourth time period T4, the electric power supply from the AC power supply 8 to the power supply 5 can be secured. Note that when a user operates the operation section so as to maximize the light output of the load 7, securing the first time period T1 and the fourth time period T4 is prioritized, and the second time period T2 may be controlled to be a time period shorter than a length at which the light output is maximized.

Setting the definite time to be sufficient for the electric power supply from the AC power supply 8 to the power supply 5 enables a stable operation of the controller 6 while reducing the distortion of the current waveform.

REFERENCE SIGNS LIST 1, 1A Dimming Device
2, 2A Bidirectional Switch
4 Inputter
5 Power Supply
6 Controller
7 Load (Illumination Load)
8 AC Power Supply
11 Input Terminal
12 Input Terminal
50 Charging Path
52 Drive Power Supply (Constant Voltage Circuit)
53 Current Limiter
C1 Capacitive Element
C2 Capacitive Element
Q10 Transistor
Q11 Switching Device
R3 Resistor (Detection Resistor)
ZD1 Zener Diode

The invention claimed is:

1. A dimming device, comprising:
a pair of input terminals electrically connected between an illumination load and an AC power supply;
a bidirectional switch configured to switch between non-conduction and conduction of a bidirectional current between the pair of input terminals;
an inputter configured to receive a dimming level specifying a magnitude of a light output of the illumination load;
a power supply electrically connected between the pair of input terminals and configured to be supplied with electric power from the AC power supply to generate control electric power;
a controller configured to be supplied with the control electric power from the power supply to operate, the controller being configured to control the bidirectional switch in accordance with the dimming level; and
a current limiter configured to stop generation of the control electric power by the power supply when a current larger than or equal to a specified value flows from the AC power supply to the power supply.

2. The dimming device according to claim 1, wherein
the power supply includes a capacitive element, and
the current limiter is disposed in a charging path for the capacitive element between the pair of input terminals and is configured to interrupt the charging path when a current larger than or equal to the specified value flows through the charging path.

3. The dimming device according to claim 2, wherein
the power supply includes a constant voltage circuit including a Zener diode and a transistor, and
the current limiter is configured to turn off the transistor when a current larger than or equal to the specified value flows through the transistor.

4. The dimming device according to claim 3, wherein
the current limiter includes:
a detection resistor electrically connected to an output terminal of the transistor and
a switching device electrically connected between the output terminal and a control terminal of the transistor, and
the current limiter is configured such that when a current larger than or equal to the specified value flows through the detection resistor, the voltage across the detection resistor turns on the switching device.

5. The dimming device according to claim 1, wherein
the power supply includes a constant voltage circuit including a Zener diode and a transistor, and
the current limiter is configured to turn off the transistor when a current larger than or equal to the specified value flows through the transistor.

6. The dimming device according to claim 5, wherein
the current limiter includes:
a detection resistor electrically connected to an output terminal of the transistor and
a switching device electrically connected between the output terminal and a control terminal of the transistor, and
the current limiter is configured such that when a current larger than or equal to the specified value flows through the detection resistor, the voltage across the detection resistor turns on the switching device.

* * * * *